US012187450B1

(12) United States Patent
Roller et al.

(10) Patent No.: US 12,187,450 B1
(45) Date of Patent: Jan. 7, 2025

(54) INTEGRATED COOLING STRUCTURES AND METHODS FOR AERIAL VEHICLE PROPULSION MECHANISMS

(71) Applicant: Amazon Technologies, Inc., Seattle, WA (US)

(72) Inventors: Rick Roller, Seattle, WA (US); Sung Ho An, Seattle, WA (US); Tausif Husain, Maple Valley, WA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 17/839,970

(22) Filed: Jun. 14, 2022

(51) Int. Cl.
*B64D 33/08* (2006.01)

(52) U.S. Cl.
CPC .................... *B64D 33/08* (2013.01)

(58) Field of Classification Search
CPC ........ B64D 33/00; B64D 33/08; B64D 33/10; B64D 41/00; B64U 30/20
USPC .......................................................... 244/57
See application file for complete search history.

(56) References Cited

U.S. PATENT DOCUMENTS

| | | | | |
|---|---|---|---|---|
| 5,284,012 A | * | 2/1994 | Laborie | F02C 7/12 60/39.08 |
| 2017/0001721 A1 | * | 1/2017 | Saika | B64U 20/80 |
| 2020/0052556 A1 | * | 2/2020 | Luo | H02K 7/14 |
| 2020/0346745 A1 | * | 11/2020 | Cai | B64D 29/04 |
| 2021/0396194 A1 | * | 12/2021 | Neal | B64D 27/24 |
| 2023/0246513 A1 | * | 8/2023 | Silin | B64C 39/024 310/62 |

* cited by examiner

*Primary Examiner* — Brady W Frazier
(74) *Attorney, Agent, or Firm* — Athorus, PLLC (57) ABSTRACT

Integrated cooling structures and methods may comprise a motor, a propeller, and a component having at least one structural feature configured to receive or channel airflow to generate a positive pressure region at a first end of the motor. During operation of the motor and propeller, a negative pressure region may be generated at a second end of the motor proximate the propeller. The positive and negative pressure regions may generate a pressure differential or gradient between ends of the motor, such that a cooling airflow may be generated that flows through an interior of the motor from the positive pressure region to the negative pressure region. The cooling airflow may increase cooling of internal components of the motor, and consequently improve various operational capabilities, performance, and reliability of the motor and associated vehicle, machine, or system.

19 Claims, 7 Drawing Sheets

INTEGRATED COOLING STRUCTURES AND METHODS FOR AERIAL VEHICLE PROPULSION MECHANISMS

BACKGROUND

Unmanned aerial vehicles ("UAVs") are continuing to increase in use. For example, UAVs may often utilize propulsion mechanisms including motors and propellers. Such conventional motors and associated aerial vehicles may utilize only ambient air to provide cooling of the motors. However, operational capabilities, performance, and reliability of motors, and associated aerial vehicles, may be limited due to lack of sufficient cooling from heat generated during operations. Accordingly, there is a need for integrated structures and methods to provide improved cooling airflow to motors, thereby increasing operational capabilities, performance, and reliability of motors and associated aerial vehicles.

DETAILED DESCRIPTION

As is set forth in greater detail below, implementations of the present disclosure are directed to integrated cooling structures and methods for propulsion mechanisms of an aerial vehicle to improve operational capabilities, performance, and reliability of the propulsion mechanisms, as well as an associated aerial vehicle.

In example embodiments, a propulsion mechanism for an aerial vehicle may comprise a motor and a propeller. The motor may comprise an inrunner motor, an outrunner motor, or various other types of motors. In addition, the motor and propeller may operate in a traction-drive, or pulling, configuration, e.g., the motor and propeller may generate thrust to pull or lift a portion of the aerial vehicle during flight operations.

In example embodiments, the motor may be coupled to a structure or component at a first end, e.g., at a lower portion or end of the motor, and a propeller may be coupled to and rotated by the motor at a second end, e.g., at an upper portion or end of the motor. During operation of the motor and corresponding rotation of the propeller, a negative pressure region may be generated proximate the second end of the motor as a result of the airflow and thrust generated by the motor and propeller.

In example embodiments, the structure or component proximate the first end of the motor may comprise a portion of a fuselage or body of the aerial vehicle, a wing, a motor or control arm, a fairing, or other structural portion of the aerial vehicle. The structure or component may include one or more structural features to facilitate generation of a positive pressure region proximate the first end of the motor. Such structural features may comprise pockets, cups, divots, scallops, depressions, or other similar features, and/or may comprise flanges, lips, guards, louvers, protrusions, or other similar features. By forming, incorporating, or integrating one or more structural features within the structure or component proximate the first end, a positive pressure region may be generated proximate the first end of the motor as a result of the airflow and thrust generated by the motor and propeller.

In further example embodiments, the motor may include various vents, holes, or other air passageways to allow airflow into the motor from the positive pressure region proximate the first end of the motor, and the motor may also include various vents, holes, or other air passageways to allow airflow out of the motor toward the negative pressure region proximate the second end of the motor. Due to the pressure differential between the positive and negative pressure regions, cooling airflow within the motor may be generated that flows from the first end of the motor toward the second end of the motor, and the cooling airflow may substantially improve cooling characteristics for various internal components of the motor, such as portions of the stator, windings, rotor, various electronics, or other components.

By intentionally generating positive and negative pressure regions proximate ends of a motor via integrated cooling structures, a pressure differential may be leveraged to generate cooling airflow for internal components of the motor. Utilizing such intentionally and substantially passively generated cooling airflow, operational capabilities, performance, reliability, and various other aspects of a motor may be improved. Moreover, such improvements to motor operations may also enable various improvements to operational capabilities, performance, reliability, and various other aspects of an aerial vehicle. Furthermore, although the examples described herein generally relate to aerial vehicles, the integrated cooling structures and methods described herein may be utilized on various other types of vehicles, such as ground or water-based vehicles, as well as various other machinery, equipment, systems, or apparatus.

Figure 1:
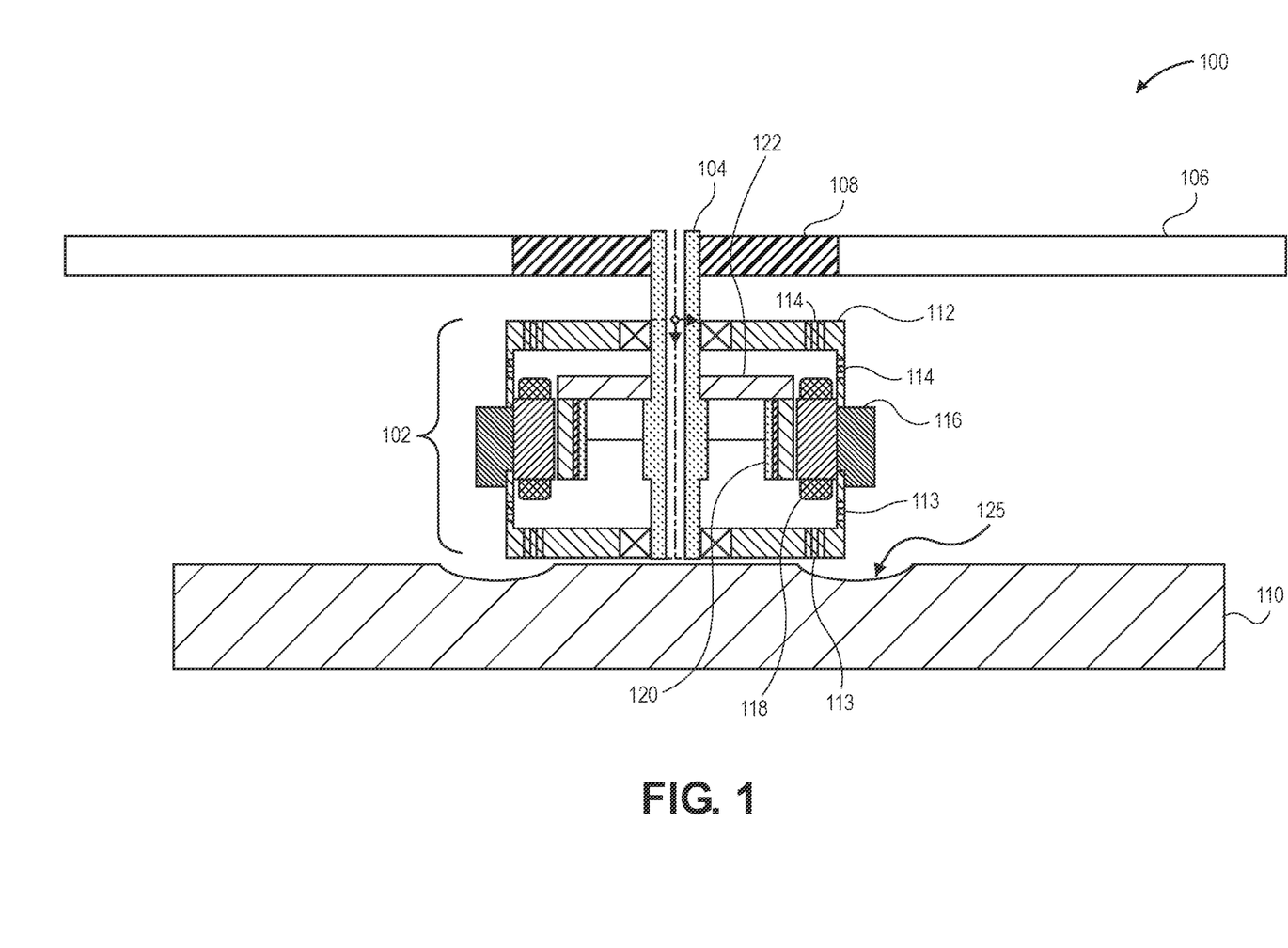
FIG. 1 is a schematic, cross-sectional, side view diagram of an example integrated cooling structure and propulsion mechanism of an aerial vehicle, in accordance with implementations of the present disclosure.

FIG. 1 is a schematic, cross-sectional, side view diagram 100 of an example integrated cooling structure and propulsion mechanism of an aerial vehicle, in accordance with implementations of the present disclosure.

As shown in FIG. 1, a motor 102 may rotate a motor shaft 104 that is coupled to a propeller 106 via a propeller hub 108. In example embodiments, the propeller 106 may be coupled to the motor 102 proximate a second end of the motor 102, e.g., an end of the motor 102 toward an upper portion of FIG. 1. In addition, the motor 102 may be coupled to a structure or component 110 proximate a first end of the motor 102, e.g., an end of the motor 102 toward a lower portion of FIG. 1.

The motor 102 may further include a casing 112 that substantially surrounds and encases internal components of the motor 102. In addition, the casing 112 may include one or more first vents 113 proximate a first end of the motor 102, and may include one or more second vents 114 proximate a second end of the motor 102. The first and second vents 113, 114 may comprise radial vents, e.g., arranged on a radial surface of the casing 112, and/or may comprise axial vents, e.g., arranged on axial end surfaces of the casing 112.

Further, the motor 102 may include one or more cooling fins 116, a stator 118, a rotor 120, an internal fan 122, and/or various other internal components. The cooling fins 116 may be arranged on an outer surface of the casing 112, e.g., arranged on an exterior radial surface of the casing 112, and the cooling fins 116 may increase a surface area associated with the casing 112 in order to dissipate heat from the motor 102 to ambient air and/or airflows associated with an exterior of the casing 112.

The stator 118 may comprise a plurality of stator poles or teeth having corresponding windings. In addition, the rotor 120 may comprise a plurality of magnets arranged around a periphery of the rotor 120. During operation, the stator 118 and rotor 120 may interact to cause rotation of the rotor 120 in a desired rotational direction and at a desired rotational speed. Further, the rotor 120 may be coupled or engaged with the motor shaft 104 to cause rotation of the motor shaft 104 together with rotation of the rotor 120.

The internal fan 122 may also be coupled or engaged with the motor shaft 104 to cause rotation of the internal fan 122 together with rotation of the rotor 120 and motor shaft 104. The internal fan 122 may include one or more blades with various pitches to cause or generate airflow in a desired direction. In some example embodiments, the internal fan 122 may generate airflow in an upward direction from first vents 113 proximate the first end and toward second vents 114 proximate the second end, which may facilitate the cooling airflow generated by a pressure differential between first and second ends of the motor 102, as further described herein. In addition, blades of the internal fan 122 may generally be positioned relative to an interior of the motor to facilitate cooling airflow along airgaps associated with the rotor and/or stator. Further, portions of the internal fan 122 that are not proximate the rotor and/or stator may not include blades, e.g., may be formed as flat disks or annular rings, to force or bias cooling airflow toward the rotor and/or stator.

In other example embodiments, the internal fan 122 may generate airflow in a downward direction from second vents 114 proximate the second end and toward first vents 113 proximate the first end. In some examples, operation of the internal fan 122 may reinforce or support generation of a pressure differential between first and second ends of the motor 102, as further described herein. In other examples, operation of the internal fan 122 may cause generation of a circular or regenerating airflow within portions of the motor 102 that cooperates with the cooling airflow generated by a pressure differential between first and second ends of the motor 102, as further described herein. In addition, blades of the internal fan 122 may generally be positioned relative to an interior of the motor to facilitate or reinforce generation of the pressure differential to cause cooling airflow along airgaps associated with the rotor and/or stator. Further, portions of the internal fan 122 that are not proximate the rotor and/or stator may not include blades, e.g., may be formed as flat disks or annular rings, to force or bias cooling airflow toward the rotor and/or stator.

Figure 2:
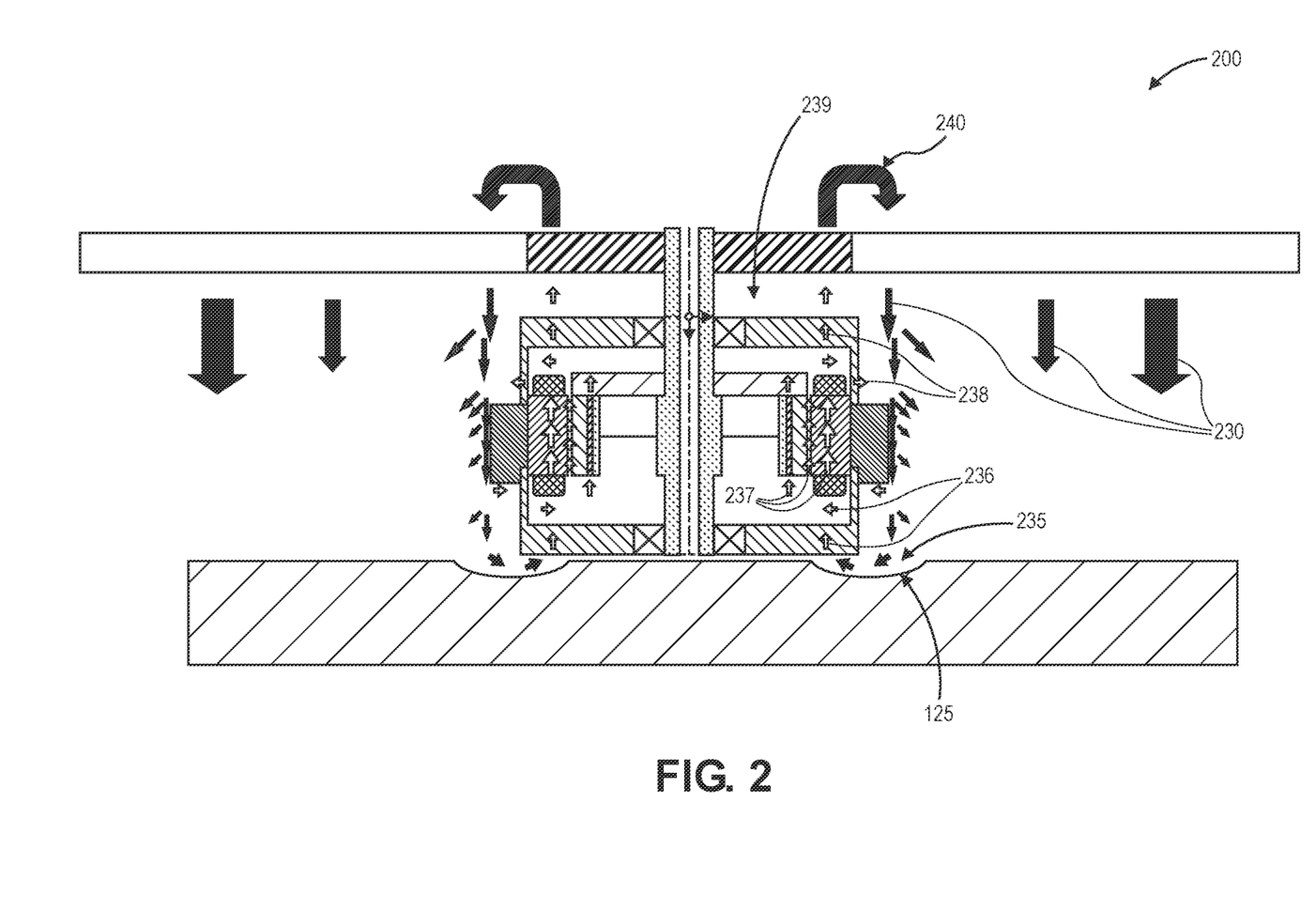
FIG. 2 is a schematic, cross-sectional, side view diagram of an example cooling airflow generated by an integrated cooling structure and a propulsion mechanism of an aerial vehicle, in accordance with implementations of the present disclosure.

As will be further described herein at least with respect to FIG. 2, operation of the motor 102 and propeller 106 may generate a negative pressure region proximate the second end of the motor 102, e.g., in, around, or proximate the propeller 106, propeller hub 108, and/or upper portion of motor shaft 104.

In example embodiments, the structure or component 110 may comprise a fuselage or body of a vehicle, a wing, a motor or control arm, a fairing, or any other structural component or portion of a vehicle, system, or machine to which the motor 102 and propeller 106 are coupled for operation. In addition, the component 110 may include one or more structural features 125 proximate the first end of the motor 102. As will be further described herein at least with respect to FIG. 2, the structural features 125 may facilitate generation of a positive pressure region proximate the first end of the motor 102 during operation of the motor 102 and propeller 106.

Generally, the various structural features 125 described herein may receive or channel at least a portion of the airflow generated by operation of the motor 102 and propeller 106 toward the first end of the motor 102 in order to generate a positive pressure region proximate the first end of the motor 102. Then, the positive pressure region proximate the first end and the negative pressure region proximate the second end may generate a pressure differential or gradient between the first and second ends of the motor 102, and the pressure differential or gradient may be leveraged to generate a cooling airflow within the motor 102, as further described herein.

For example, the structural features 125 of the component 110 may comprise various types of depressions, such as pockets, cups, divots, scallops, annular rings or pools, or other recessed, cutout, or depressed features. The various types of depressions may receive or channel at least a portion of the airflow generated by operation of the motor 102 and propeller 106 in order to generate a positive pressure region proximate the first end of the motor 102.

In addition, the structural features 125 of the component 110 may comprise various types of protrusions, such as flanges, lips, fences, guards, louvers, annular levees or walls, or other raised, extended, or protruding features. The various types of protrusions may also receive or channel at least a portion of the airflow generated by operation of the motor 102 and propeller 106 in order to generate a positive pressure region proximate the first end of the motor 102.

Further, the structural features 125 of the component 110 may comprise various types of open-ended or closed-ended features. Open-ended features may include one or more holes, orifices, or other passageways that may allow at least a portion of airflow into, through, and out of the structural features 125, e.g., from a bottom or distal end, to affect the generation of the positive pressure region. Closed-ended features may not include any holes, orifices, or other passageways and thereby prevent any portion of airflow through and out of the structural features 125, e.g., from a bottom or distal end, to affect the generation of the positive pressure region. The various types of open-ended or closed-ended features may also receive or channel at least a portion of the airflow generated by operation of the motor 102 and propeller 106 in order to generate a positive pressure region proximate the first end of the motor 102.

Moreover, the structural features 125 of the component 110 may comprise various types or amounts of enveloping features. Enveloping features may surround, enclose, or cover at least a portion of a motor 102 or casing 112 to affect the generation of the positive pressure region. Non-enveloping features may not surround, enclose, or cover at least a portion of a motor 102 or casing 112 to affect the generation of the positive pressure region. The various types of enveloping or non-enveloping features may also receive or channel at least a portion of the airflow generated by operation of the motor 102 and propeller 106 in order to generate a positive pressure region proximate the first end of the motor 102.

Furthermore, the structural features 125 of the component 110 may comprise various numbers or types of pieces, parts, or sections, and/or various types of materials, such as metals, plastics, composites, other materials, or combinations thereof. Various pieces or parts of structural features 125, as well as parts formed of various materials, may be added to or removed from the component 110 to affect the generation of the positive pressure region. The various numbers or types of pieces, parts, or materials of structural features may also receive or channel at least a portion of the airflow generated by operation of the motor 102 and propeller 106 in order to generate a positive pressure region proximate the first end of the motor 102.

In addition, the structural features 125 of the component 110 may comprise various symmetrical or asymmetrical features with respect to the motor 102 and casing 112. Symmetrical features may be positioned or formed substantially radially symmetrically around the casing 112 to affect the generation of the positive pressure region. Asymmetrical features may be positioned or formed substantially asymmetrically around portions of the casing 112 to affect the generation of the positive pressure region. The various types of symmetrical or asymmetrical features may also receive or channel at least a portion of the airflow generated by operation of the motor 102 and propeller 106 in order to generate a positive pressure region proximate the first end of the motor 102.

Various combinations of any of the above structural features 125 of the component 110 may be used to affect the generation of the positive pressure region proximate the first end of the motor 102 as desired.

Although FIG. 1 illustrates a particular number, type, configuration, and arrangement of a motor, propeller, and component having structural features to generate cooling airflow, other example embodiments may include various other numbers, types, configurations, and arrangements of a motor, propeller, and component having structural features to generate cooling airflow. For example, although FIG. 1 illustrates an inrunner motor, other example embodiments may include an outrunner motor, or various other types of motors. In addition, various other combinations of sizes or shapes of motors and propellers may be used. Further, various components, such as cooling fins, an internal fan, and/or other components, may be optional or omitted. Moreover, although FIG. 1 schematically illustrates the component 110 as a substantially flat plate or surface, other example embodiments may include components having various other sizes, shapes, or arrangements, such as beams, rods, wings, airfoils, flat shapes, curved shapes, convex shapes, concave shapes, fairings, cup or cone shapes, and/or various other sizes, shapes, or arrangements.

FIG. 2 is a schematic, cross-sectional, side view diagram 200 of an example cooling airflow generated by an integrated cooling structure and a propulsion mechanism of an aerial vehicle, in accordance with implementations of the present disclosure. FIG. 2 illustrates substantially similar components as shown and described with respect to FIG. 1.

As shown in FIG. 2, during operation of the motor and propeller, e.g., in a traction-drive or pulling configuration, a thrusting or lifting airflow 230 may be generated below the propeller and toward the motor and component. In addition, in response to operation of the motor and propeller, a negative pressure region 239 may be generated proximate at least one of the propeller, propeller hub, and/or upper portion of the motor shaft, e.g., proximate the second end of the motor.

As schematically illustrated by the differently sized arrows of FIG. 2, the thrusting or lifting airflow 230 may generally increase with greater radial distance from the motor or motor shaft. In addition, at least a portion of the thrusting or lifting airflow 230 may be directed downward along or proximate the casing toward the first end of the motor.

The one or more structural features 125 of the component may receive, capture, or channel at least a portion of the thrusting or lifting airflow 230 that is directed downward along or proximate the casing. As a result of the structural features 125 of the component, a positive pressure region 235 may be generated proximate the first end of the motor.

Due to the negative pressure region 239 proximate the second end of the motor and the positive pressure region 235 proximate the first end of the motor, a pressure differential or pressure gradient may be generated between the first and second ends of the motor. As the airflow moves from the positive pressure region 235 to an interior of the motor or casing, through various portions of the interior of the motor or casing, and out of the motor or casing to the negative pressure region 239, the airflow may move among various pressure gradients or regions from a positive pressure associated with the positive pressure region 235 to a negative pressure associated with the negative pressure region 239.

For example, from the positive pressure region 235, new cooling airflow 236 may enter an interior of the motor and casing via one or more first vents proximate the first end of the motor. For example, an interior of the motor and casing proximate the first vents may have a first lower pressure than the positive pressure region 235.

Then, active cooling airflow 237 may traverse through various air gaps within the interior of the motor and casing. The air gaps may be associated with portions of the stator, e.g., between stator poles or teeth arranged around a periphery of the stator, and/or may be associated with portions of the rotor, e.g., between sections of the rotor arranged around a periphery of the rotor. In addition, the air gaps may be positioned between portions of the rotor and the stator, between portions of the stator and the casing, between portions of the rotor and the casing, and/or between various other portions of internal components of the motor. For example, the air gaps within the interior of the motor and casing may have a second lower pressure than the positive pressure region 235, the second lower pressure being lower than the first lower pressure.

Further, used cooling airflow 238 may then exit an interior of the motor and casing via one or more second vents proximate the second end of the motor. For example, an interior of the motor and casing proximate the second vents may have a third lower pressure than the positive pressure region 235, the third lower pressure being lower than the second lower pressure.

Moreover, the airflow may enter the negative pressure region 239 that has a negative pressure generated in response to operation of the motor and propeller, the negative pressure being lower than each of the first, second, and third lower pressures. Finally, a curling or recirculating airflow 240 may be generated, in response to operation of the motor and propeller, as air is pulled away from the negative pressure region 239 and forced downward as part of the thrusting or lifting airflow 230.

The various airflows described herein with respect to FIG. 2 may repeat and recirculate during operation of a motor and propeller. Because of the structural features 125 of the component that generate the positive pressure region 235, in combination with the negative pressure region 239 that is generated in response to operation of the motor and propeller, cooling airflow may be generated that flows through an interior of the motor and casing to cool various internal components of the motor, e.g., a stator, windings, and/or rotor of the motor. Further, the cooling airflow may be generated based on the pressure differential or gradient between the positive and negative pressure regions associated with the first and second ends of the motor, respectively.

Although FIG. 2 illustrates a particular number, type, configuration, and arrangement of airflows relative to a motor, propeller, and component having structural features to generate cooling airflow, other example embodiments may include various other numbers, types, configurations, and arrangements of airflows relative to a motor, propeller, and component having structural features to generate cooling airflow. For example, the cooling airflows within an interior of the motor and casing may take other paths based on different configurations or arrangements of internal components of various types of motors. In addition, the cooling airflows into and out of the motor and casing may take various paths based on presence or absence of radial vents, axial vents, or combinations thereof associated with the casing. Further, FIG. 2 illustrates simplified airflows in response to operation of a motor and propeller, whereas actual airflows may include turbulence, disturbances, other types of airflow, asymmetrical airflow, and/or other variations or combinations of airflows.

Figure 3A:
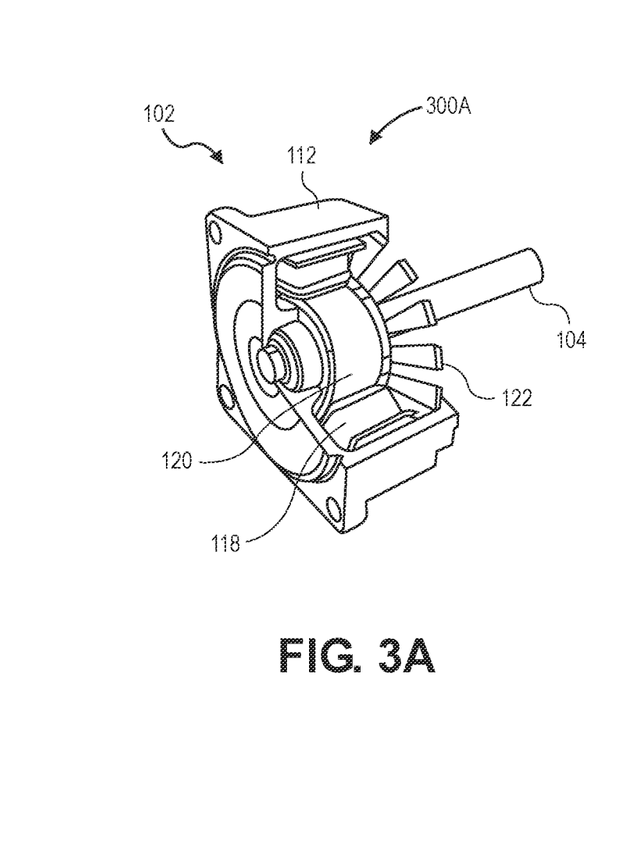
FIG. 3A is a schematic, partial cutaway, perspective view diagram of an example motor of a propulsion mechanism of an aerial vehicle, in accordance with implementations of the present disclosure.
Figure 3B:
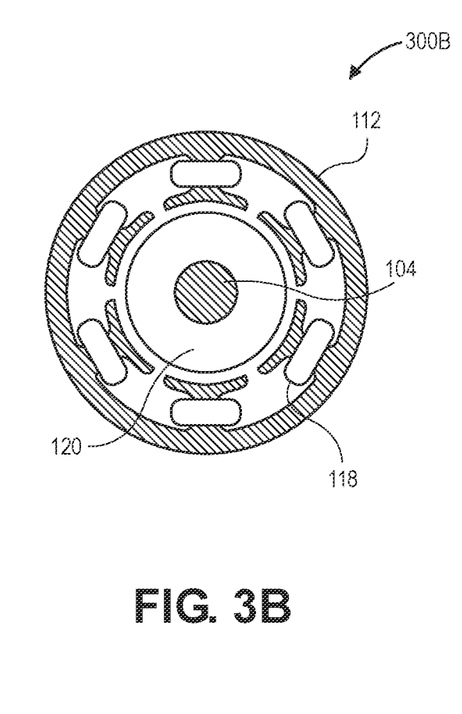
FIG. 3B is a schematic, cross-sectional, end view diagram of an example motor of a propulsion mechanism of an aerial vehicle, in accordance with implementations of the present disclosure.

FIG. 3A is a schematic, partial cutaway, perspective view diagram 300A of an example motor of a propulsion mechanism of an aerial vehicle, in accordance with implementations of the present disclosure, and FIG. 3B is a schematic, cross-sectional, end view diagram 300B of an example motor of a propulsion mechanism of an aerial vehicle, in accordance with implementations of the present disclosure.

As shown in FIGS. 3A and 3B, the example motor 102 may comprise an inrunner motor having a motor shaft 104, a casing 112, a stator 118, a rotor 120, and an internal fan 122. Although not shown in FIGS. 3A and 3B, the casing 112 may include one or more first vents proximate a first end of the motor, e.g., toward a left side of the motor 102 shown in FIG. 3A, and may also include one or more second vents proximate a second end of the motor, e.g., toward a right side of the motor 102 shown in FIG. 3A.

In response to operation of the motor 102 and associated propeller (not shown) coupled to motor shaft 104, a negative pressure region may be generated proximate the second end of the motor, and a positive pressure region may be generated proximate the first end of the motor due to one or more structural features associated with a component at the first end of the motor, as further described herein. From the positive pressure region, cooling airflow may enter, via first vents, the first end of the motor based on the pressure differential between the positive and negative pressure regions.

The cooling airflow may traverse from the first end to the second end of the motor along air gaps between stator poles or teeth of the stator 118, as illustrated in the cutaway view of FIG. 3A, as well as in the cross-sectional end view of FIG. 3B. In addition, the cooling airflow may traverse from the first end to the second end of the motor along air gaps between the stator and rotor, as can be seen in the cross-sectional end view of FIG. 3B. The cooling airflow may also traverse along various other air gaps that may be present relative to different internal components of the motor 102.

After traversing along various air gaps that may be present relative to different internal components of the motor 102 based on the pressure differential between the positive and negative pressure regions, the cooling airflow may exit, via second vents, toward the second end of the motor to the negative pressure region. Then, the cooling airflow that enters proximate a first end of a motor, moves along various air gaps within an interior of a motor as described herein with respect to FIGS. 3A and 3B, and exits proximate a second end of a motor, may repeat and recirculate during operation of a motor and propeller.

Although FIGS. 3A and 3B illustrate an example inrunner motor, various other types of motors, such as outrunner motors or other types, may include similar or different air gaps along or between different internal components of such motors via which cooling airflow may circulate to cool the internal components based on the pressure differential that is generated as further described herein.

Figure 4:
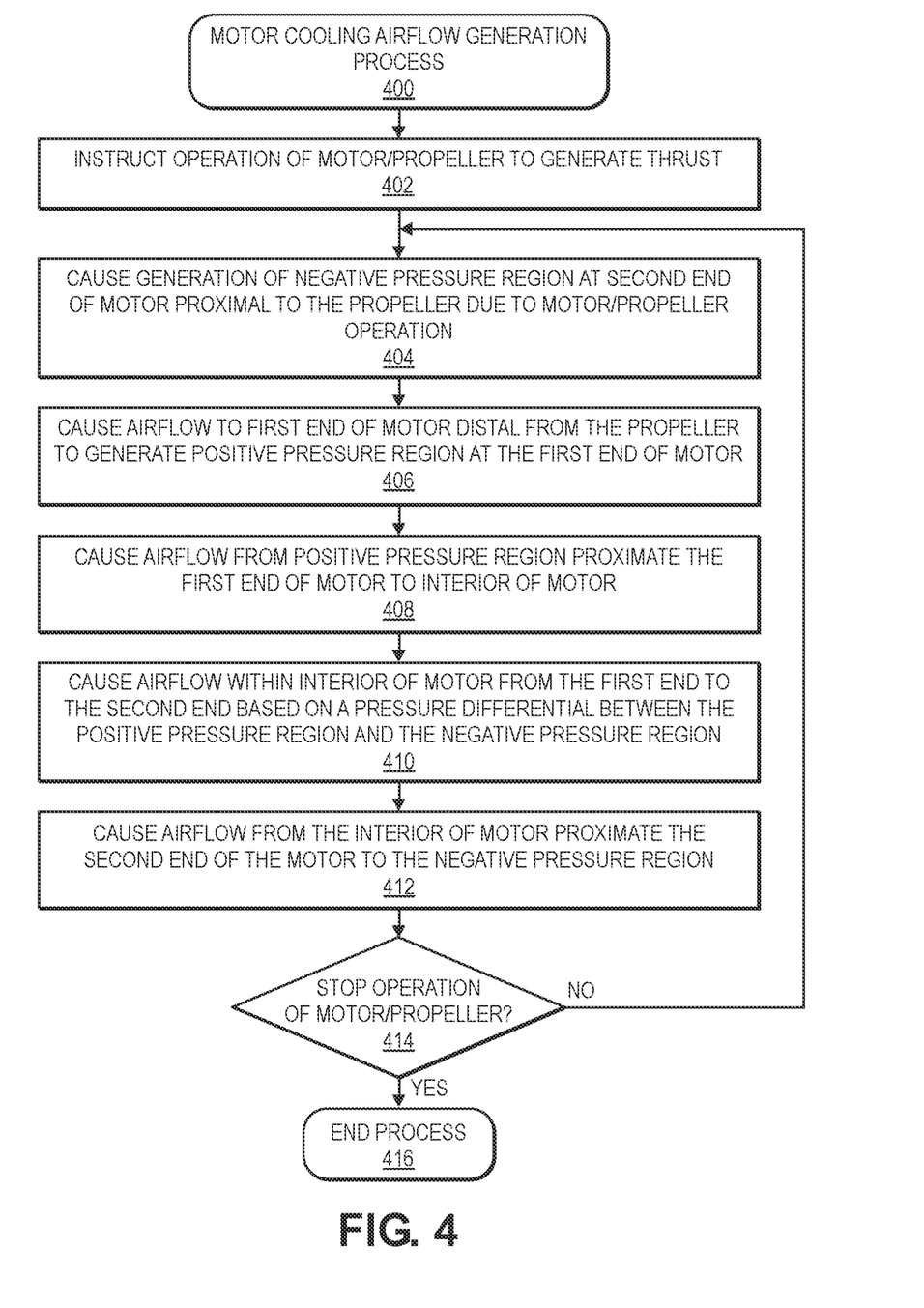
FIG. 4 is a flow diagram illustrating an example motor cooling airflow generation process, in accordance with implementations of the present disclosure.

FIG. 4 is a flow diagram illustrating an example motor cooling airflow generation process 400, in accordance with implementations of the present disclosure.

The process 400 may begin by instructing operation of a motor and propeller to generate thrust, as at 402. For example, a controller or control system may instruct a motor and propeller to initiate operation. The motor and propeller may be configured to operate in a traction-drive, or pulling, configuration. In addition, the motor and propeller may be associated with a vehicle, such as an aerial vehicle, or may be associated with various other types of vehicles, systems, machines, or equipment. In examples in which the motor and propeller are associated with an aerial vehicle, operation of the motor and propeller may generate thrust or lift to enable flight operations of the aerial vehicle. Further, a control system may instruct operation of the motor and propeller.

The process 400 may continue by causing generation of a negative pressure region at a second end of the motor proximal to the propeller due to the motor and propeller operation, as at 404. For example, in response to operation of the motor and propeller, a negative pressure region may be generated proximate at least one of the propeller, propeller hub, and/or upper portion of a motor shaft of the motor, e.g., proximate a second end of the motor. The operation of the motor and propeller, and consequent generation of airflow for thrust or lift, may generate the negative pressure region proximate the second end of the motor.

The process 400 may proceed by causing airflow to a first end of the motor distal from the propeller to generate a positive pressure region at the first end of the motor, as at 406. For example, in response to operation of the motor and propeller and consequent generation of airflow for thrust or lift, a positive pressure region may be generated proximate a first end of the motor, e.g., an opposite end of the motor from the second end. In addition, a component proximate the first end of the motor may include one or more structural features to cause generation of the positive pressure region. For example, the component may comprise a fuselage or body of a vehicle, a wing, a motor or control arm, a fairing, or any other structural component or portion of a vehicle, system, or machine. Further, the structural features of the component may comprise depressions, protrusions, open-ended or closed-ended features, enveloping or non-enveloping features, symmetrical or asymmetrical features, other types of airflow receiving or channeling features, and/or various combinations thereof.

By the intentional and substantially passive generation of a positive pressure region at the first end of the motor opposite the negative pressure region at the second end of the motor, a pressure differential or gradient may be generated that spans from the first end to the second end of the motor. This pressure differential or gradient may then be leveraged to generate cooling airflow that is configured to cool internal components of the motor and that flows from the first end to the second end of the motor.

The process 400 may continue to cause airflow from the positive pressure region proximate the first end of the motor to an interior of the motor, as at 408. For example, one or more first vents may be associated with the motor or casing to enable cooling airflow from the positive pressure region at an exterior of the motor at the first end to enter an interior of the motor. The first vents may comprise radial vents, axial vents, or combinations thereof. The cooling airflow into the interior of the motor may be caused by the pressure differential or gradient as a result of the positive and negative pressure regions at opposite ends of the motor.

The process 400 may proceed to cause airflow within the interior of the motor from the first end to the second end based on the pressure differential between the positive pressure region and the negative pressure region, as at 410. For example, the cooling airflow that entered the interior of the motor proximate the first end of the motor may then continue to flow through the interior of the motor, e.g., along air gaps among and between internal components of the motor, such as a stator, windings, rotor, or other internal components. In addition, the cooling airflow may generally flow from the first end of the motor toward the second end of the motor. Further, the flow of the cooling airflow along air gaps within the interior of the motor may again be caused by the pressure differential or gradient as a result of the positive and negative pressure regions at opposite ends of the motor.

The process 400 may then continue with causing airflow from the interior of the motor proximate the second end of the motor to the negative pressure region, as at 412. For example, one or more second vents may be associated with the motor or casing to enable cooling airflow that has traversed along air gaps within an interior of the motor to exit the interior of the motor proximate the second end of the motor. The second vents may also comprise radial vents, axial vents, or combinations thereof. The cooling airflow out of the interior of the motor may again be caused by the pressure differential or gradient as a result of the positive and negative pressure regions at opposite ends of the motor.

The process 400 may proceed with determining whether to stop operation of the motor and propeller, as at 414. For example, a controller or control system may instruct a motor and propeller to stop operation. The motor and propeller may be instructed to stop operation for various reasons, e.g., completion of a task or operation, adjustments or modifications to vehicle, system, or machine operations, stopping of operation for safety reasons, landing of an aerial vehicle, parking of a ground or water-based vehicle, and/or various other reasons. In examples in which the motor and propeller are associated with an aerial vehicle, operation of the motor and propeller may be stopped upon completion of flight or navigation, responsive to adjustments to flight phases or dynamics, e.g., changing between horizontal and vertical flight operations, for safety reasons, e.g., preventing injury or damage, and/or for various other reasons. Further, a control system may instruct stopping operation of the motor and propeller.

If it is determined that operation of the motor and propeller is not to be stopped, the process 400 may return to step 404 to continue operation of the motor and propeller, and to continue generation of the cooling airflow in response to generation of a pressure differential or gradient at opposite ends of the motor. If, however, it is determined that operation of the motor and propeller is to be stopped, the process 400 may then end, as at 416.

By the intentional and substantially passive generation of a positive pressure region at the first end of the motor due to structural features associated with a component at the first end of the motor, a pressure differential or gradient may be generated that spans from the first end of the motor to the second end of the motor at which a negative pressure region may be generated in response to operation of the motor and propeller. This pressure differential or gradient may then be leveraged to generate cooling airflow that is configured to cool internal components of the motor and that flows from the first end to the second end of the motor.

The increased cooling airflow due to the generated pressure differential or gradient may improve various operational capabilities, performance, reliability, and/or other aspects of motors and associated aerial vehicles. In some examples, the increased cooling airflow generated by the pressure differential or gradient described herein may reduce the operating temperature of a motor by approximately 30%, approximately 40%, approximately 50%, or other amounts or ranges. By increasing cooling airflow to internal components of a motor, a motor having smaller size, less weight, and/or lower cost may be utilized for a desired application. In addition, by increasing cooling airflow, the performance, reliability, and expected operational duration or life of the motor may also be improved.

Furthermore, by increasing cooling airflow to internal components of a motor, an aerial vehicle for a desired application may have smaller size, less weight, and/or lower cost as a result of the use of motors having smaller size, less weight, and/or lower cost. In addition, an aerial vehicle having smaller size and/or less weight may have lower power consumption, greater operational range, improved agility or maneuverability, and/or other operational improvements or advantages. Moreover, improved reliability and expected operational duration or life of the motors may correspondingly increase the reliability and expected operational duration or life of the aerial vehicle, while also reducing repair or maintenance costs, vehicle downtime, and/or other aspects of aerial vehicle operational costs, repair, or maintenance.

Figure 5:
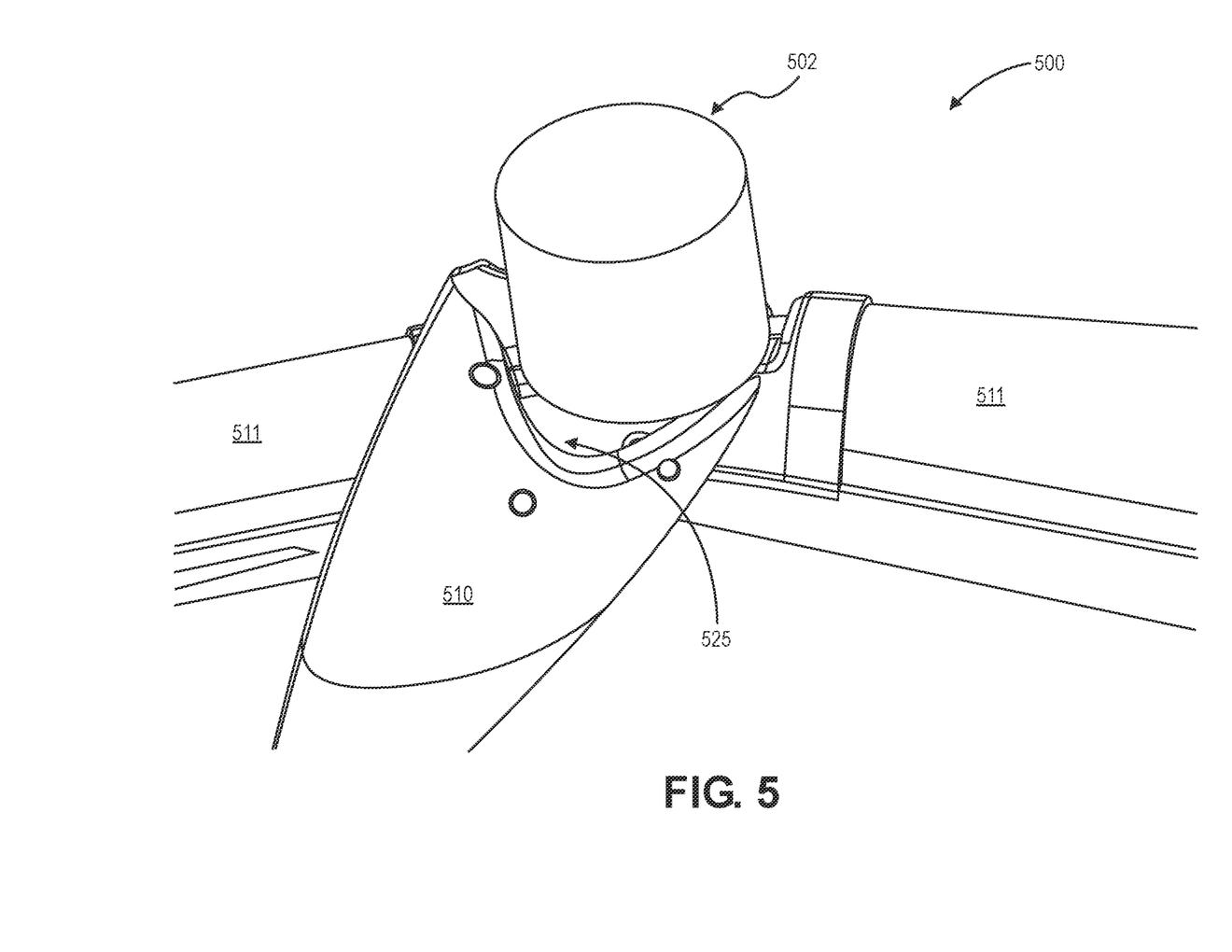
FIG. 5 is a schematic, perspective view diagram of another example integrated cooling structure and propulsion mechanism of an aerial vehicle, in accordance with implementations of the present disclosure.

FIG. 5 is a schematic, perspective view diagram 500 of another example integrated cooling structure and propulsion mechanism of an aerial vehicle, in accordance with implementations of the present disclosure.

As shown in FIG. 5, a motor 502 may be coupled to one or more components, such as a fairing 510 and/or portions of a motor arm 511, and the fairing 510 may include structural features 525 to generate a positive pressure region proximate a first end of the motor 502, e.g., a lower portion of the motor as shown in FIG. 5. For clarity of illustration, a propeller is not shown proximate a second end of the motor 502, e.g., an upper portion of the motor as shown in FIG. 5.

The structural features 525 of FIG. 5 may include depressions, such as a pocket, cup, or cavity associated with an interior of the fairing 510. In addition, the structural features 525 may include protrusions, such as a flange, lip, or edge associated with edges or surfaces of the fairing 510. Further, the structural features 525 may comprise at least partially enveloping features that enclose or surround a portion of the motor, e.g., a lower, left portion of the motor as shown in FIG. 5. Moreover, the structural features 525 may comprise either open-ended or closed-ended features, e.g., a lower end of the cone-shaped fairing 510 may or may not have one or more openings, orifices, or passageways to allow airflow to pass through and out of the fairing 510. Furthermore, the structural features 525 may comprise at least partially asymmetrical features that are not radially symmetrical around a periphery of the motor 502. In addition, the structural features 525 may be formed from one or multiple pieces or parts associated with the fairing 510, and/or may be formed of various materials, such as metals, plastics, composites, other materials, or combinations thereof.

Various aspects of the structural features 525 may be selected or determined in order to generate a positive pressure region having desired pressure characteristics at a first end of the motor, such that desired attributes of cooling airflow to internal components of the motor may be generated during operation of the motor and propeller.

Figure 6:
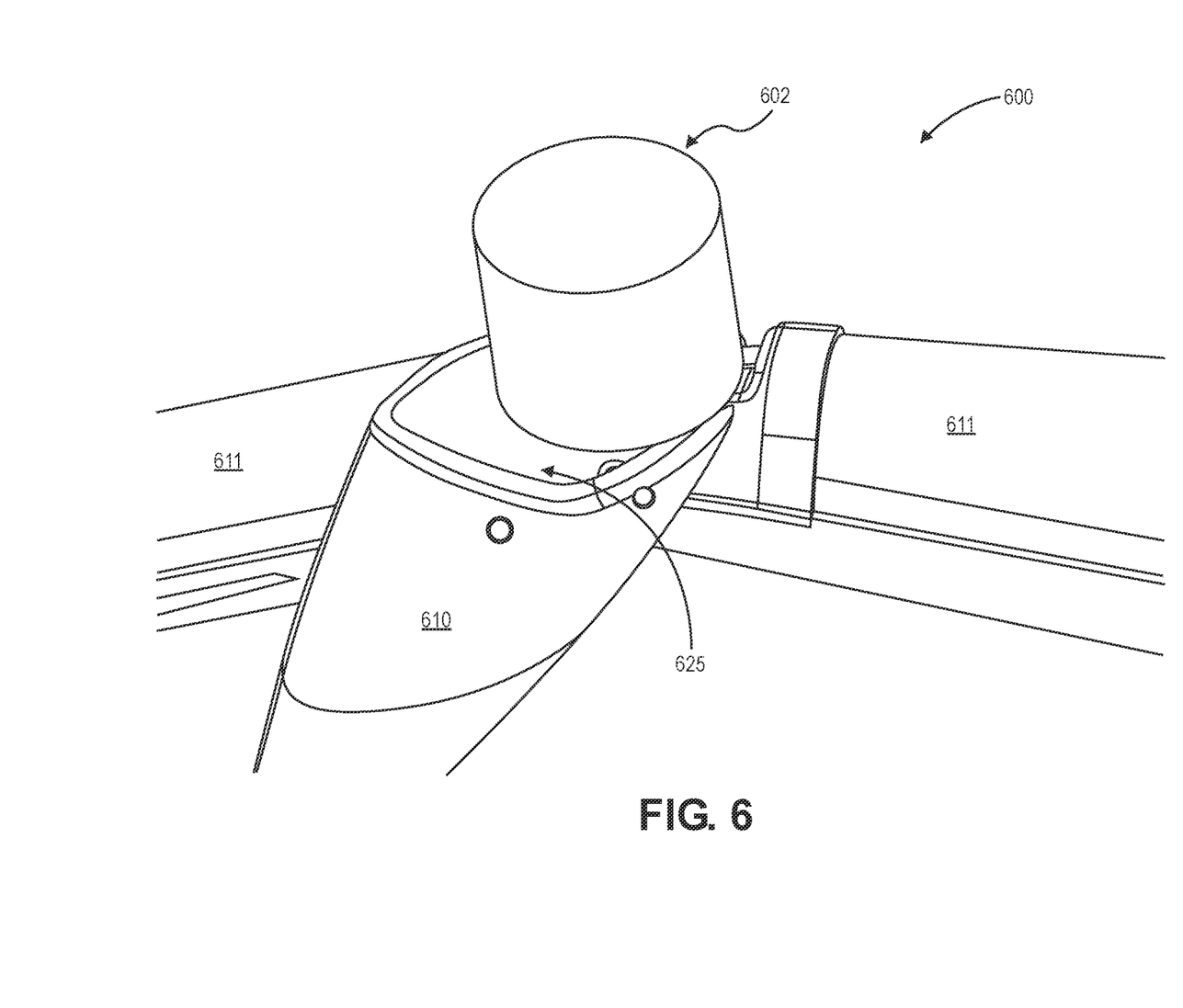
FIG. 6 is a schematic, perspective view diagram of a further example integrated cooling structure and propulsion mechanism of an aerial vehicle, in accordance with implementations of the present disclosure.

FIG. 6 is a schematic, perspective view diagram 600 of a further example integrated cooling structure and propulsion mechanism of an aerial vehicle, in accordance with implementations of the present disclosure.

As shown in FIG. 6, a motor 602 may be coupled to one or more components, such as a fairing 610 and/or portions of a motor arm 611, and the fairing 610 may include structural features 625 to generate a positive pressure region proximate a first end of the motor 602, e.g., a lower portion of the motor as shown in FIG. 6. For clarity of illustration, a propeller is not shown proximate a second end of the motor 602, e.g., an upper portion of the motor as shown in FIG. 6.

The structural features 625 of FIG. 6 may include depressions, such as a pocket, cup, or cavity associated with an interior of the fairing 610. In addition, the structural features 625 may include protrusions, such as a flange, lip, or edge associated with edges or surfaces of the fairing 610. Further, the structural features 625 may comprise generally non-enveloping features that do not enclose or surround any portions of the motor. Moreover, the structural features 625 may comprise either open-ended or closed-ended features, e.g., a lower end of the cone-shaped fairing 610 may or may not have one or more openings, orifices, or passageways to allow airflow to pass through and out of the fairing 610. Furthermore, the structural features 625 may comprise at least partially asymmetrical features that are not radially symmetrical around a periphery of the motor 602. In addition, the structural features 625 may be formed from one or multiple pieces or parts associated with the fairing 610, and/or may be formed of various materials, such as metals, plastics, composites, other materials, or combinations thereof.

Various aspects of the structural features 625 may be selected or determined in order to generate a positive pressure region having desired pressure characteristics at a first end of the motor, such that desired attributes of cooling airflow to internal components of the motor may be generated during operation of the motor and propeller.

Figure 7:
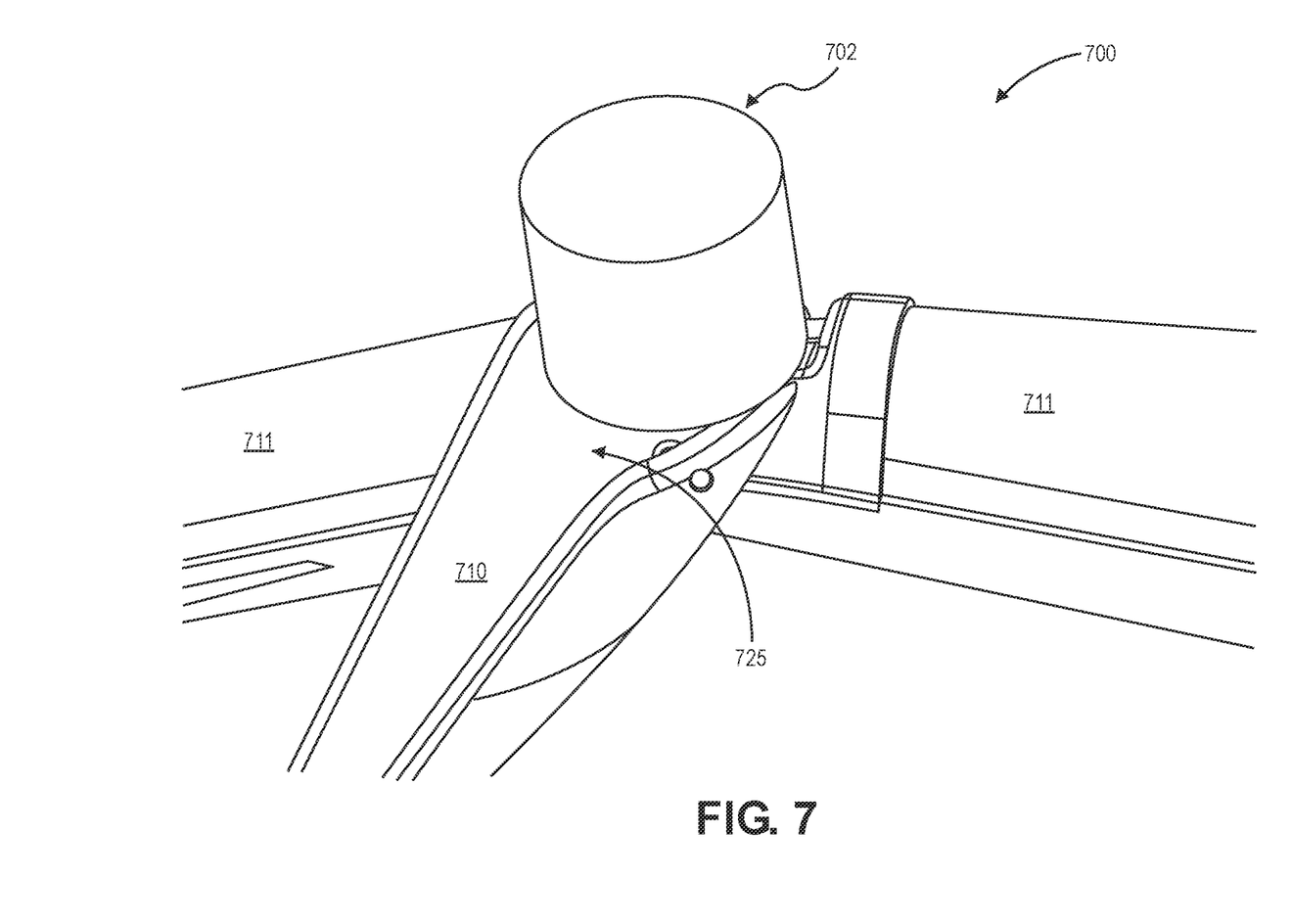
FIG. 7 is a schematic, perspective view diagram of yet another example integrated cooling structure and propulsion mechanism of an aerial vehicle, in accordance with implementations of the present disclosure.

FIG. 7 is a schematic, perspective view diagram 700 of yet another example integrated cooling structure and propulsion mechanism of an aerial vehicle, in accordance with implementations of the present disclosure.

As shown in FIG. 7, a motor 702 may be coupled to one or more components, such as a fairing 710 and/or portions of a motor arm 711, and the fairing 710 may include structural features 725 to generate a positive pressure region proximate a first end of the motor 702, e.g., a lower portion of the motor as shown in FIG. 7. For clarity of illustration, a propeller is not shown proximate a second end of the motor 702, e.g., an upper portion of the motor as shown in FIG. 7.

The structural features 725 of FIG. 7 may include depressions, such as a partially open or exposed pocket, cup, or cavity associated with an inner surface of the fairing 710. In addition, the structural features 725 may include protrusions, such as a partial flange, lip, or edge associated with edges or surfaces of the fairing 710. Further, the structural features 725 may comprise generally non-enveloping features that do not enclose or surround any portions of the motor. Moreover, the structural features 725 may comprise either open-ended or closed-ended features, e.g., a lower end of the cone-shaped fairing 710 may or may not have one or more openings, orifices, or passageways to allow airflow to pass through and out of the fairing 710. Furthermore, the structural features 725 may comprise asymmetrical features that are not radially symmetrical around a periphery of the motor 702. In addition, the structural features 725 may be formed from one or multiple pieces or parts associated with the fairing 710, and/or may be formed of various materials, such as metals, plastics, composites, other materials, or combinations thereof.

Various aspects of the structural features 725 may be selected or determined in order to generate a positive pressure region having desired pressure characteristics at a first end of the motor, such that desired attributes of cooling airflow to internal components of the motor may be generated during operation of the motor and propeller.

In example embodiments other than those illustrated in FIGS. 5-7, various other combinations of aspects of structural features may be included or combined. Further, the structural features may be associated with various types of components, including but not limited to fuselages, bodies, wings, motor or control arms, fairings, or other structural components associated with various types of vehicles, machines, equipment, or other systems.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIG. 4, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An integrated cooling structure for a propulsion mechanism of an aerial vehicle, comprising:
   a motor coupled to a motor arm and a fairing of an aerial vehicle proximate a first end of the motor;
   a propeller coupled to a motor shaft proximate a second end of the motor and configured to be rotated by the motor; and
   a depression formed within the fairing proximate the first end of the motor, the depression being at least partially surrounded by a protrusion associated with an edge of the fairing;
   wherein a casing of the motor includes a first vent proximate the first end, and a second vent proximate the second end; and
   wherein during rotation of the propeller by the motor,
      a negative pressure region is generated proximate the second end of the motor;
      a positive pressure region is generated proximate the depression at the first end of the motor; and
      a cooling airflow is generated within the motor from the first vent to the second vent due to a pressure differential generated between the positive pressure region and the negative pressure region.

2. The integrated cooling structure of claim 1, where the cooling airflow that is generated within the motor is configured to cool at least one of a stator, a winding, or a rotor of the motor; and
   wherein the motor comprises at least one of an inrunner motor or an outrunner motor.

3. The integrated cooling structure of claim 1, wherein the depression is integrally formed within a portion of the fairing.

4. The integrated cooling structure of claim 1, wherein the first vent and the second vent comprise at least one of a radial vent or an axial vent.

5. A system, comprising:
   a motor;
   a propeller coupled proximate a second end of the motor and configured to be rotated by the motor; and
   a component positioned proximate a first end of the motor and including at least one structural feature configured to cause generation of a positive pressure region proximate the first end, wherein the at least one structural feature comprises a depression and a protrusion at least partially surrounding the depression associated with the component;
   wherein during rotation of the propeller by the motor, a cooling airflow is generated within the motor due to a pressure differential generated between the positive pressure region and a negative pressure region proximate the second end.

6. The system of claim 5, wherein the component comprises at least one of a fuselage, a wing, a motor arm, a fairing, or a structural component of a machine.

7. The system of claim 5, wherein the at least one structural feature comprises a symmetrical feature of the component.

8. The system of claim 5, wherein the at least one structural feature comprises an open-ended feature of the component.

9. The system of claim 5, wherein the at least one structural feature comprises an enveloping feature of the component.

10. The system of claim 5, wherein the motor comprises a casing; and
    wherein the casing includes a first vent proximate the first end, and a second vent proximate the second end.

11. The system of claim 10, wherein the first vent comprises at least one of a radial vent or an axial vent proximate the first end; and
wherein the cooling airflow that is generated within the motor enters the motor via the first vent.

12. The system of claim 10, wherein the second vent comprises at least one of a radial vent or an axial vent proximate the second end; and
wherein the cooling airflow that is generated within the motor exits the motor via the second vent.

13. The system of claim 5, wherein the motor comprises a stator and a rotor; and
wherein the cooling airflow that is generated within the motor is configured to cool a portion of at least one of the stator or the rotor of the motor.

14. The system of claim 5, wherein the motor comprises an internal fan; and
wherein the internal fan is rotated by the motor and configured to facilitate generation of the cooling airflow within the motor.

15. A method, comprising:
instructing operation of a motor and a propeller coupled to a second end of the motor;
causing generation of a negative pressure region proximate the second end of the motor;
causing generation of a positive pressure region proximate a first end of the motor, the first end of the motor being positioned proximate a component including at least one structural feature configured to cause generation of the positive pressure region, wherein the at least one structural feature comprises a depression and a protrusion at least partially surrounding the depression associated with the component; and
causing generation of cooling airflow within the motor due to a pressure differential between the positive pressure region and the negative pressure region.

16. The method of claim 15, wherein the cooling airflow that is generated within the motor enters the motor via a first vent of a casing of the motor proximate the first end.

17. The method of claim 15, wherein the cooling airflow that is generated within the motor is configured to cool a portion of at least one of a stator or a rotor of the motor.

18. The method of claim 15, wherein the cooling airflow that is generated within the motor exits the motor via a second vent of a casing of the motor proximate the second end.

19. The method of claim 15, wherein the component comprises at least one of a fuselage, a wing, a motor arm, a fairing, or a structural component of a machine.

* * * * *